(12) United States Patent
Inoue et al.

(10) Patent No.: US 6,865,552 B1
(45) Date of Patent: Mar. 8, 2005

(54) DATA COPYING SYSTEM, DATA COPYING APPARATUS, DATA COPYING METHOD, AND RECORDING MEDIUM

(75) Inventors: Mitsuhiro Inoue, Osaka (JP); Shunji Harada, Osaka (JP); Masayuki Kozuka, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/452,622

(22) Filed: Dec. 1, 1999

(30) Foreign Application Priority Data

Dec. 2, 1998 (JP) .......................................... 10-343490

(51) Int. Cl.$^7$ .............................................. G06F 17/60
(52) U.S. Cl. ............................. 705/57; 705/51; 705/52; 705/53; 705/54; 705/55; 705/56; 705/58; 705/59
(58) Field of Search .................................... 705/51–59

(56) References Cited

U.S. PATENT DOCUMENTS

| | | | |
|---|---|---|---|
| 4,796,220 A | | 1/1989 | Wolfe |
| 4,945,563 A | | 7/1990 | Horton et al. |
| 5,319,735 A | | 6/1994 | Preuss et al. ............... 395/2.14 |
| 5,687,191 A | * | 11/1997 | Lee et al. .................... 375/146 |
| 5,719,937 A | * | 2/1998 | Warren et al. ................ 360/60 |
| 5,805,699 A | * | 9/1998 | Akiyama et al. ............. 705/58 |
| 6,154,541 A | * | 11/2000 | Zhang .......................... 380/28 |

FOREIGN PATENT DOCUMENTS

| | | |
|---|---|---|
| EP | 0413350 | 2/1991 |

(List continued on next page.)

OTHER PUBLICATIONS

Lau, Robert, Internet trends: CMB Software Tackles the Online Content Challenge. Asia Computer Weekly: Nov. 22, 1999. Retrived on DIALOG.21 Jan. 2004.*
European Search Report, Application No. 99 12 3823, dated Oct. 3, 2000.
Canadian Office Action regarding Application No. 2,319, 623 dated Mar. 6, 2003.

Primary Examiner—James P. Trammell
Assistant Examiner—James A. Reagan
(74) Attorney, Agent, or Firm—Renner, Otto, Boisselle & Sklar, LLP

(57) ABSTRACT

A data copying system of the present invention includes a data copying apparatus for copying data recorded on a first recording medium to a second recording medium. The data copying apparatus includes: a data read section for reading out the data from the first recording medium; a data modification control section for controlling modification of the data in accordance with modification control information, the modification control information being provided for controlling the modification of the data; and a data write section for writing an output of the data modification control section to the second recording medium. The modification control information includes a copying permission flag indicating whether the copying of the data permitted, a quality control flag for controlling a quality of modified data which is obtained by modifying the data, and a billing control flag for controlling billing for the copying of the data. The data modification control section determines whether billing is required for the copying of the data in accordance with the billing control flag. When the billing is required, the data modification control section controls the modification of the data in accordance with the copying permission flag and the quality control flag, after confirming that the billing has been done by the billing apparatus. When the billing is not required, the data modification control section controls the modification of the data in accordance with the copying permission flag and the quality control flag, without confirming that the billing has been done by the billing apparatus.

10 Claims, 15 Drawing Sheets

FOREIGN PATENT DOCUMENTS

| | | |
|---|---|---|
| EP | 0668695 | 8/1995 |
| EP | 0769780 | 4/1997 |
| EP | 0783167 | 9/1997 |
| EP | 0813194 | 12/1997 |
| EP | 0942417 | 9/1999 |
| JP | 05-258463 | 10/1993 |
| JP | 7-505984 | 7/1994 |
| JP | 07249262 | 9/1995 |
| JP | 07-249262 | 9/1995 |
| JP | 08006879 | 12/1996 |
| JP | 09-171658 | 6/1997 |
| JP | 09-181910 | 7/1997 |
| JP | 09181910 | 11/1997 |
| JP | 09-330561 | 12/1997 |
| WO | WO 99/13611 A1 * | 9/1997 ............. H04L/9/00 |

* cited by examiner

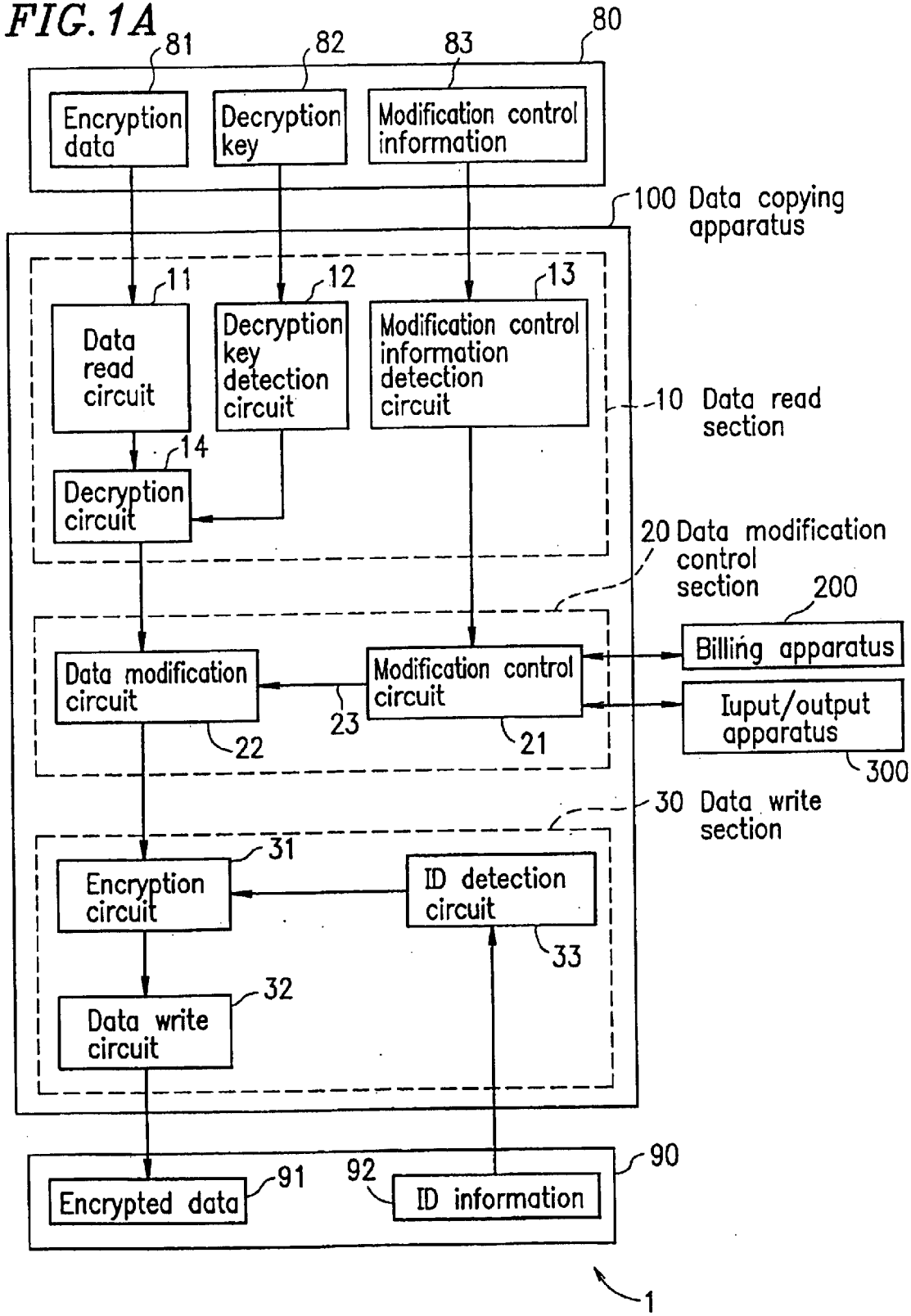

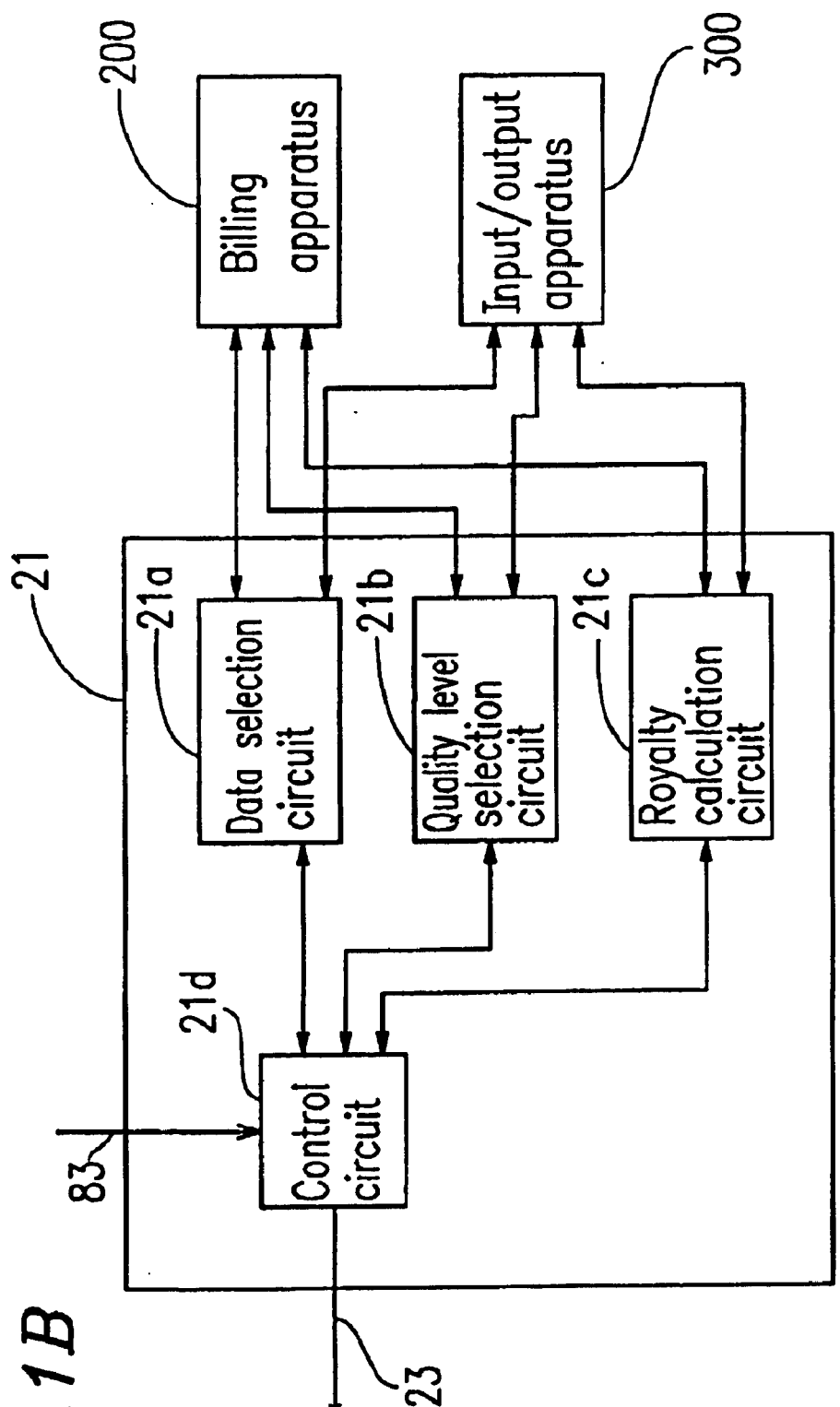

FIG.4A

| Select musical piece(s) to be copied | | | | |
|---|---|---|---|---|
| Music number | Title | Copying permitted | High quality copying permitted | Billing for copying required |
| 1 | song01 | Yes | Yes | Yes |
| 2 | song02 | Yes | Yes | Yes |
| 3 | song03 | Yes | Yes | No |
| 4 | song04 | Yes | No | No |

FIG.4B

| Select quality level for each musical piece | | | | |
|---|---|---|---|---|
| Music number | Title | Royalty for quality level 1 (2ch 20bit 48kHz) | Royalty for quality level 2 (6ch 20bit 48kHz) | Royalty for quality level 3 (6ch 24bit 192kHz) |
| 1 | song01 | 20 yen | 50 yen | 100 yen |
| 2 | song02 | 15 yen | 35 yen | 70 yen |

FIG.4C

| Music number | Title | Quality level | Royalty |
|---|---|---|---|
| 1 | song01 | 3 | 100 yen |
| 2 | song02 | 2 | 35 yen |
| Total | — | — | 135 yen |

Copying is to be done for the above royalty. OK?

| Yes | No |

FIG.6

| | Data copying apparatus 100 | Billing apparatus 200 | Function |
|---|---|---|---|
| Step S601 | ● | | |
| S602 | →  | | Search_Server() |
| S603 | ← | | Reply_Server() |
| S604 | ● | | |
| S605 | → | | Send(Data_A) |
| S606 | | ● | |
| S607 | ← | | Send(Data_B) |
| S608 | ● | | |
| S609 | → | | Send(Data_C) |
| S610 | | ● | |
| S611 | ← | | Send(Data_D) |
| S612 | ● | | |
| S613 | → | | Send(Data_E) |
| S614 | | ● | |
| S615 | ← | | Send(Data_F) |
| S616 | ● | | |

FIG. 7A

| | |
|---|---|
| User ID | 24bit |
| ISRC | 24bit |
| Number of musical pieces | 24bit |
| Music number #1 | 24bit |
| ⋮ | |
| Music number #L | 24bit |

FIG. 7B

| | |
|---|---|
| User ID | 24bit |
| ISRC | 24bit |
| Number of musical pieces | 24bit |
| Music number #1 | 24bit |
| Royalty for copying of music number #1 at quality level 1 | 16bit |
| Royalty for copying of music number #1 at quality level 2 | 16bit |
| Royalty for copying of music number #1 at quality level 3 | 16bit |
| ⋮ | |
| Music number #L | 24bit |
| Royalty for copying of music number #L at quality level 1 | 16bit |
| Royalty for copying of music number #L at quality level 2 | 16bit |
| Royalty for copying of music number #L at quality level 3 | 16bit |

FIG. 7C

| | |
|---|---|
| User ID | 24bit |
| ISRC | 24bit |
| Number of musical pieces | 24bit |
| Music number #1 | 24bit |
| Quality level for music number #1 | 2bit |
| ⋮ | |
| Music number #L | 24bit |
| Quality level for music number #L | 2bit |

FIG. 7D

| | |
|---|---|
| User ID | 24bit |
| Application ID | 24bit |
| ISRC | 24bit |
| Number of musical pieces | 24bit |
| Music number #1 | 24bit |
| Royalty for copying of music number #1 | 16bit |
| ⋮ | |
| Music number #L | 24bit |
| Royalty for copying of music number #L | 16bit |

FIG.8A

| | |
|---|---|
| HQC001 | User ID |
| JPABC9812345 | ISRC |
| 2 | Number of musical pieces |
| 1 | Music number #1 |
| 2 | Music number #2 |

FIG.8B

| | |
|---|---|
| HQC001 | User ID |
| JPABC9812345 | ISRC |
| 2 | Number of musical pieces |
| 1 | Music number #1 |
| 20 | Royalty for copying of music number #1 at quality level 1 |
| 50 | Royalty for copying of music number #1 at quality level 2 |
| 100 | Royalty for copying of music number #1 at quality level 3 |
| 2 | Music number #2 |
| 15 | Royalty for copying of music number #2 at quality level 1 |
| 35 | Royalty for copying of music number #2 at quality level 2 |
| 70 | Royalty for copying of music number #2 at quality level 3 |

FIG. 8C

| | |
|---|---|
| HQC001 | User ID |
| JPABC9812345 | ISRC |
| 2 | Number of musical pieces |
| 1 | Music number #1 |
| 3 | Quality level for music number #1 |
| 2 | Music number #2 |
| 2 | Quality level for music number #2 |

FIG. 8D

| | |
|---|---|
| HQC001 | User ID |
| A001 | Application ID |
| JPABC9812345 | ISRC |
| 2 | Number of musical pieces |
| 1 | Music number #1 |
| 100 | Royalty for copying of music number #1 at quality level 3 |
| 2 | Music number #2 |
| 35 | Royalty for copying of music number #2 at quality level 2 |

FIG. 8E

| | |
|---|---|
| HQC001 | User ID |
| A001 | Application ID |
| 2611 | Password |

FIG. 8F

| | |
|---|---|
| HQC001 | User ID |
| A001 | Application ID |
| 1 | Billing completion flag |

DATA COPYING SYSTEM, DATA COPYING APPARATUS, DATA COPYING METHOD, AND RECORDING MEDIUM

BACKGROUND OF THE INVENTION

1. Field of the Invention

The present invention relates to a data copying system, a data copying apparatus, a data copying method and a recording medium for copying digital data such as music data with a copyright protection function.

2. Description of the Related Art

Conventionally, high quality video and sound data has been recorded/reproduced by using a special apparatus for digitally recording/reproducing video and sound data to/from a recording medium. Media for recording digital data include a laser disk (LD), a compact disk (CD), a mini disk (MD) and a digital versatile disk (DVD).

Such a digital data recording medium, unlike an analog data recording medium such as a (compact) cassette tape and a VHS tape, is characterized in that the quality of the recorded data is less likely to degrade through copying. In other words, it is easier for digital data than analog data to be accurately recorded/reproduced. The quality of digital data never degrades as long as data that is identical to the digital data stored in an original recording medium is written to a duplicate recording medium.

However, a user of an apparatus for record-ing/reproducing a digital data recording medium may duplicate a commercially sold recording medium in which video data, music data, or the like, is recorded, thereby infringing the copyright of the copyright holder of the recorded data. In view of this, such an apparatus for recording/reproducing a digital data recording medium is provided with a function to restrict copying of a recording medium. For example, when music data is copied from a CD to an MD, the apparatus degrades the quality of the music data, thereby restricting such copying and thus protecting the copyright on the music data.

However, if the apparatus in designed to always degrade the sound quality of music data being copied, music data cannot be copied with high quality even when copying of the music data is permitted by the copyright holder. For example, the copyright holder of the music data may desire to selectively permit a user to duplicate the music data depending upon whether the user has paid the copyright holder the royalty for the music data. The copyright holder of the music data may also desire to permit the high quality copying of the music data free of charge.

With the conventional copying system, it is not possible to set different royalties for different sound quality levels at which copying is to be permitted so as to allow the user to select a sound quality level to the user's preference. Therefore, the sound quality level of copied music data may not meet the user's preference.

In order to solve the above-described problem, copying of data may be permitted on the condition that the royalty therefor has been paid. In such a case, it is necessary to prevent a "pirate" (a person who illegally copies data such as music data) from copying the data without paying the royalty.

SUMMARY OF THE INVENTION

According to one aspect of this invention, a data copying system includes a data copying apparatus for copying data recorded on a first recording medium to a second recording medium. The data copying apparatus includes: a data read section for reading out the data from the first recording medium; a data modification control section for controlling modification of the data in accordance with modification control information, the modification control information being provided for controlling the modification of the data; and a data write section for writing an output of the data modification control section to the second recording medium. The modification control information includes a copying permission flag indicating whether the copying of the data is permitted, a quality control flag for controlling a quality of modified data which is obtained by modifying the data, and a billing control flag for controlling billing for the copying of the data. The data modification control section determines whether billing is required for the copying of the data in accordance with the billing control flag. When the billing is required, the data modification control section controls the modification of the data in accordance with the copying permission flag and the quality control flag, after confirming that the billing has been done by the billing apparatus. When the billing is not required, the data modification control section controls the modification of the data in accordance with the copying permission flag and the quality control flag, without confirming that the billing has been done by the billing apparatus.

In one embodiment of the invention, the modification control information is recorded on the first recording medium, and the data read section reads out the modification control information from the first recording medium.

In one embodiment of the invention, the modification control information is encrypted.

In one embodiment of the invention, the modification control information is included in a predetermined frequency band of the data that is recorded on the first recording medium.

In one embodiment of the invention, the modification control information is input from outside the date copying apparatus to the data modification control section.

In one embodiment of the invention, the data modification control section outputs modified data having a quality level in accordance with the modification control information.

According to another aspect of this invention, a data copying apparatus for copying data recorded on a first recording medium to a second recording medium is provided. The data copying apparatus includes: a data read section for reading out the data from the first recording medium, a data modification control section for controlling modification of the data in accordance with modification control information, the modification control information being provided for controlling the modification of the data; and a data write section for writing an output of the data modification control section to the second recording medium. The modification control information includes a copying permission flag indicating whether the copying of the data is permitted, a quality control flag for controlling a quality of modified data which is obtained by modifying the data, and a billing control flag for controlling billing for the copying of the data. The data modification control section determines whether billing to required for the copying of the data in accordance with the billing control flag. When the billing is required, the data modification control section controls the modification of the data in accordance with the copying permission flag and the quality control flag, after confirming that the billing has been done by a billing apparatus which is provided outside the data copying apparatus. When the billing is not required, the data modification control section controls the modification of the data in accordance with the copying permission flag and the quality control flag, without confirming that the billing has been done by the billing apparatus.

In one embodiment of the invention, the modification control information is recorded on the first recording medium, and the data read section reads out the modification control information from the first recording medium.

In one embodiment of the invention, the modification control information is encrypted.

In one embodiment of the invention, the modification control information is included in a predetermined frequency band of the data that is recorded on the first recording medium.

In one embodiment of the invention, the modification control information is input from outside the data copying apparatus to the data modification control section.

In one embodiment of the invention, the data modification control section outputs modified data having a quality level in accordance with the modification control information.

According to still another aspect of this invention, a data copying method for copying data recorded on a first recording medium to a second recording medium is provided. The data copying method includes the steps of: (a) reading out the data from the first recording medium, (b) controlling modification of the data in accordance with modification control information, the modification control information being provided for controlling the modification of the data; and (c) writing an output of the data modification control section to the second recording medium. The modification control information includes a copying permission flag indicating whether the copying of the data is permitted, a quality control flag for controlling a quality of modified data which is obtained by modifying the data, and a billing control flag for controlling billing for the copying of the data. The step (b) includes the steps of: (b-1) determining whether billing is required for the copying of the data in accordance with the billing control flag; (b-2) when the billing is required, controlling the modification of the data in accordance with the copying permission flag and the quality control flag, after confirming that the billing has been done; and (b-3) when the billing is not required, controlling the modification of the data in accordance with the copying permission flag and the quality control flag, without confirming that the billing has been done.

According to still another aspect of this invention, a computer-readable recording medium recorded with a program for controlling a computer to perform a data copying operation for copying data recorded on a first recording medium to a second recording medium is provided. The data copying operation includes the steps of: (a) reading out the data from the first recording medium; (b) controlling modification of the data in accordance with modification control information, the modification control information being provided for controlling the modification of the data; and (c) writing an output of the data modification control section to the second recording medium. The modification control information includes a copying permission flag indicating whether the copying of the data to permitted, a quality control flag for controlling a quality of modified data which is obtained by modifying the data, and a billing control flag for controlling billing for the copying of the data. The step (b) includes the steps of: (b-1) determining whether billing is required for the copying of the data in accordance with the billing control flag; (b-2) when the billing is required, controlling the modification of the data in accordance with the copying permission flag and the quality control flag, after confirming that the billing has been done; and (b-3) when the billing is not required, controlling the modification of the data in accordance with the copying permission flag and the quality control flag, without confirming that the billing has been done.

According to still another aspect of this invention, a recording medium recorded with data and modification control information for controlling modification of the data is provided. The modification control information includes a copying permission flag indicating whether the copying of the data is permitted, a quality control flag for controlling a quality of modified data which is obtained by modifying the data, and a billing control flag for controlling billing for the copying of the data.

Thus, the invention described herein makes possible the advantages of: (1) providing a data copying system, a data copying apparatus, a data copying method and a recording medium with a copyright protection function which allows data to be copied with high quality when the copyright holder permits the high quality copying of the data; (2) providing a data copying system, a data copying apparatus, a data copying method and a recording medium which allows a user to select a quality level of copied data to the user's preference; and (3) providing a data copying system, a data copying apparatus, a data copying method and a recording medium which allows for high quality copying of data while preventing fraudulent high quality copying of the data when the copyright holder does not permit the high quality copying of the data.

These and other advantages of the present invention will become apparent to those skilled in the art upon reading and understanding the following detailed description with reference to the accompanying figures.

BRIEF DESCRIPTION OF THE DRAWINGS

FIG. 1A is a block diagram illustrating a configuration of a data copying system 1 according to an embodiment of the present invention;

FIG. 1B is a block diagram illustrating a configuration of a modification control circuit 21 illustrated in FIG. 1A;

FIG. 4A is a diagram illustrating an exemplary data selection screen window;

FIG. 4B is a diagram illustrating an exemplary quality level selection screen window;

FIG. 4C is a diagram illustrating an exemplary royalty confirmation screen window;

FIG. 6 is a protocol chart illustrating a procedure of the communication process between a data copying apparatus 100 and a billing apparatus 200;

FIG. 7A is a diagram illustrating an exemplary format of data A transmitted between the data copying apparatus 100 and the billing apparatus 200;

FIG. 7B is a diagram illustrating an exemplary format of data B transmitted between the data copying apparatus 100 and the billing apparatus 200;

FIG. 7C is a diagram illustrating an exemplary format of data C transmitted between the data copying apparatus 100 and the billing apparatus 200;

FIG. 7D is a diagram illustrating an exemplary format of data D transmitted between the data copying apparatus 100 and the billing apparatus 200;

FIG. 8A is a diagram illustrating a specific example of data A transmitted between the data copying apparatus 100 and the billing apparatus 200;

FIG. 8B is a diagram illustrating a specific example of data B transmitted between the data copying apparatus 100 and the billing apparatus 200;

FIG. 8C is a diagram illustrating a specific example of data C transmitted between the data copying apparatus 100 and the billing apparatus 200;

FIG. 8D is a diagram illustrating a specific example of data D transmitted between the data copying apparatus 100 and the billing apparatus 200:

FIG. 8E is a diagram illustrating a specific example of data E transmitted between the data copying apparatus 100 and the billing apparatus 200; and FIG. 8F is a diagram illustrating a specific example of data F transmitted between the data copying apparatus 100 and the billing apparatus 200.

DESCRIPTION OF THE PREFERRED EMBODIMENTS

Figure 1C:
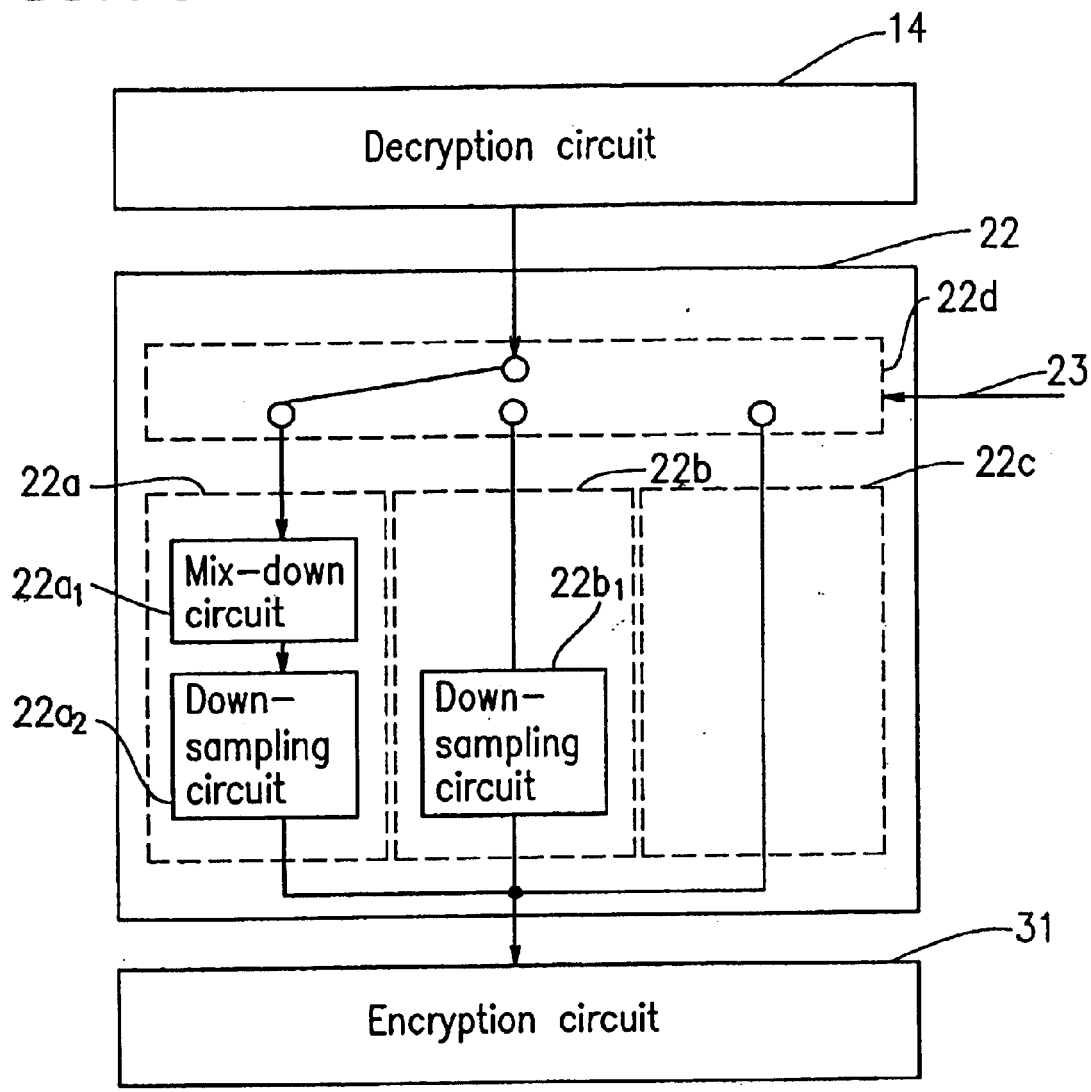
FIG. 1C is a block diagram illustrating a configuration of a data modification circuit 22 illustrated in FIG. 1A.

Embodiments of the present invention will now be described with reference to the accompanying drawings.

FIG. 1A illustrates a configuration of a data copying system 1 according to an embodiment of the present invention.

The data copying system 1 includes a data copying apparatus 100 for copying data recorded on a recording medium 80 to another recording medium 90, and a billing apparatus 200 for billing for the data copying. The recording medium 80 may be a read-only medium such as a DVD-ROM. The recording medium 90 may be random access medium such as a DVD-RAM.

The data copying apparatus 100 includes a data read section 10 for reading out data recorded on the recording medium 80, a data modification control section 20 for controlling modification of the read data, and a data write section 30 for writing an output from the data modification control section 20 to the recording medium 90.

The function of each element included in the data copying apparatus 100 may be implemented by hardware (e.g. a circuit) or software (e.g., a program). These functions may alternatively be implemented by a combination of hardware and software.

The term "modification of data" as used herein refers to any process a performed on the data for the purpose of copyright protection. Typically, "modification of data" is to degrade the quality of the data for the purpose of copyright protection. For example, degrading the sound quality of music data and degrading the image quality of video data are included in the meaning of the term "modification of data". Moreover, the term "to control modification of data" as used herein includes to control how to modify the data as well as to control not to modify the data.

In the following description, it is assumed that data recorded on the recording medium 80 is music data. However, data recorded on the recording medium 80 is not limited to music data. The present invention can be used to duplicate any type of data recorded on the recording medium 80. For example, data recorded on the recording medium 80 may alternatively be video data.

In the example illustrated in FIG. 1A, data to be copied is recorded on the recording medium 80 as encrypted data 81. The recording medium 80 includes the encrypted data 81, a decryption key 82 and modification control information 83. The encrypted data 81 is data which has been encrypted by a first encryption method. The decryption key 82 it a decryption key to the first encryption method. The encrypted data 81 is decrypted by using the decryption key 82. The modification control information 83 is a piece of information provided for controlling modification of data to be copied. The details of the modification control information 83 will be described with reference to FIG. 3. Any format can be used for recording the encrypted data 81, the decryption key 82 and the modification control information 83 on the recording medium 80.

The modification control information 83 may not necessarily be recorded on the recording medium 80. The modification control information 83 may alternatively be input from outside the data copying apparatus 100 to the data modification control section 20.

In the example illustrated in FIG. 1A, data copied by the data copying apparatus 100 is written to the recording medium 90 as encrypted data 91. The encrypted data 91 is obtained by encrypting the data output from the data modification control section 20 according to a second encryption method. The second encryption method is determined based on ID information 92 recorded on the recording medium 90. The second encryption method may be the same as or different from the first encryption method. The ID information 92 is used for identifying the recording medium 90 and is unique to the recording medium 90. The ID information 92 is recorded at a predetermined location of the recording medium 90 in the production process of the recording medium 90. Any format can be used for recording the encrypted data 91 and the ID information 92 on the recording medium 90.

The data recorded on the recording medium 80 which is to be copied may not necessarily be encrypted. For example, data equivalent to the data obtained by decrypting the encrypted data 81 by using the decryption key 82 may alternatively be recorded on the recording medium 80. In such a case, it is not necessary to decrypt the data read out from the recording medium 80 by using the decryption key 82. Accordingly, the data read out from the recording medium 80 is output to the data modification control section 20 without being decrypted.

Moreover, data to be written to the recording medium 90 may not necessarily be encrypted. The data output from the data modification control section 20 may alternatively be written to the recording medium 90 without being encrypted.

Figure 2:
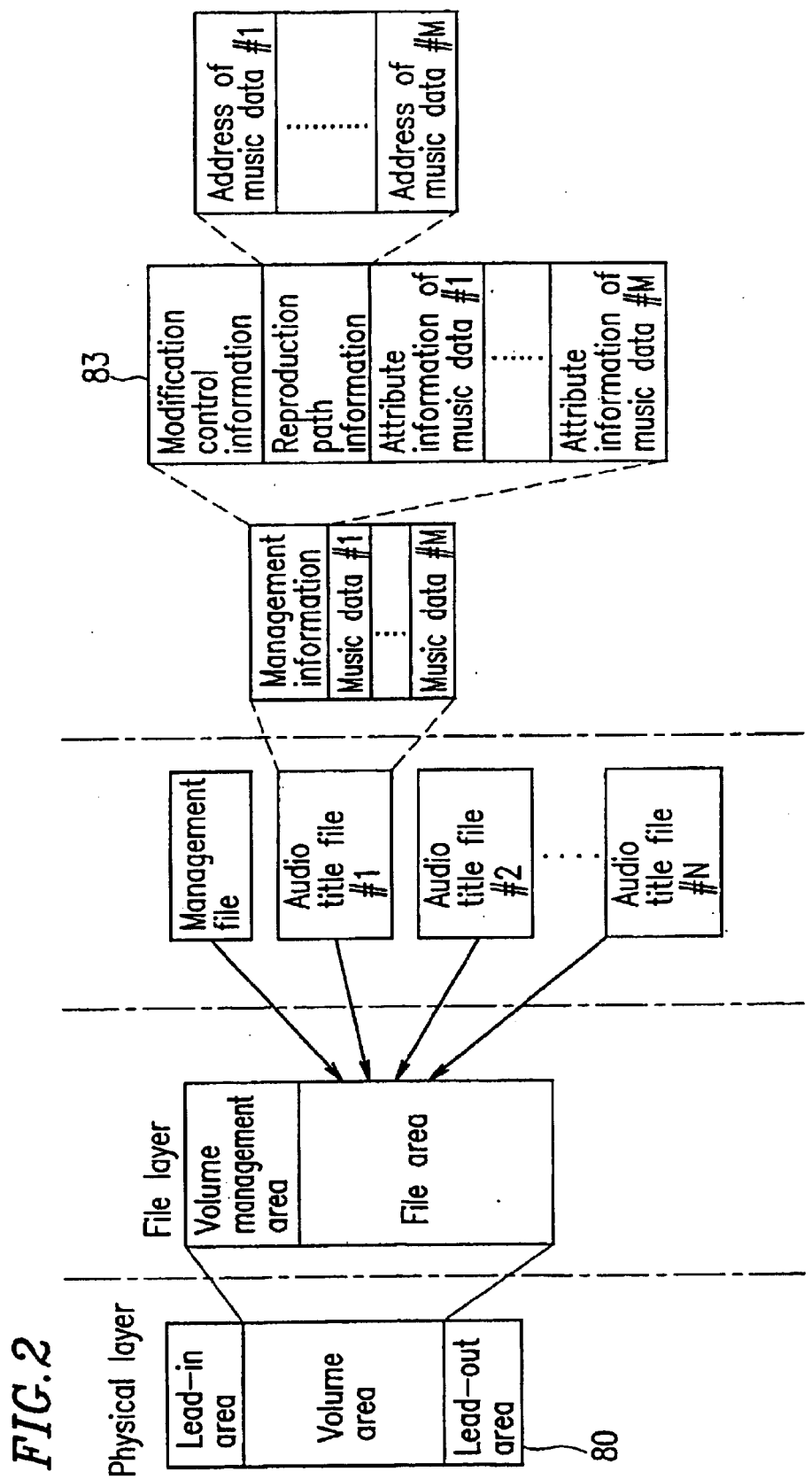
FIG. 2 is a diagram illustrating an exemplary data structure of a recording medium 80.

FIG. 2 illustrates an exemplary data structure of the recording medium 80. The recording medium 80 has a layered structure and includes a physical layer, a file layer, and the like.

The recording medium 80 includes a lead-in area, a volume area and a lead-out area. The lead-in area is provided on the inner periphery side of the recording medium 80. The lead-out area is provided on the outer periphery side of the recording medium 80. The decryption key 82 as illustrated in FIG. 1A may be recorded in, for example, the lead-in area.

The volume area includes a volume management area and a file area.

In the file area, a management file, and N audio title files #1-#N are recorded. Herein, N is an integer which satisfies $1 \leq N \leq 99$, for example. The management file is a file for managing a menu window or table-of-contents information to be displayed to the user. The audio title file is a file including management information and one or more music data.

An illustrated in FIG. 2, the audio title file #1 includes management information and a number M of music data #1-#M. Herein, M is an integer which satisfies $1 \leq M \leq 99$, for example. Each of the music data #1-#M corresponds to the encrypted data 81 as illustrated in FIG. 1A.

The management information includes the modification control information 83, reproduction path information and attribute information of each of the music data #1-#M. The reproduction path information includes an address of each of the music data #1-#M. The attribute information of each of the music data #1-#M includes information which indicates the number of channels, the quantization rate, the sampling rate, etc., of the corresponding music data.

In the example illustrated in FIG. 2, the modification control information 83 to included in the management information. However, the location of the recording medium 80 where the modification control information 83 is recorded is not limited to this. The modification control information 83 may be recorded in any location of the recording medium 80.

Figure 3:
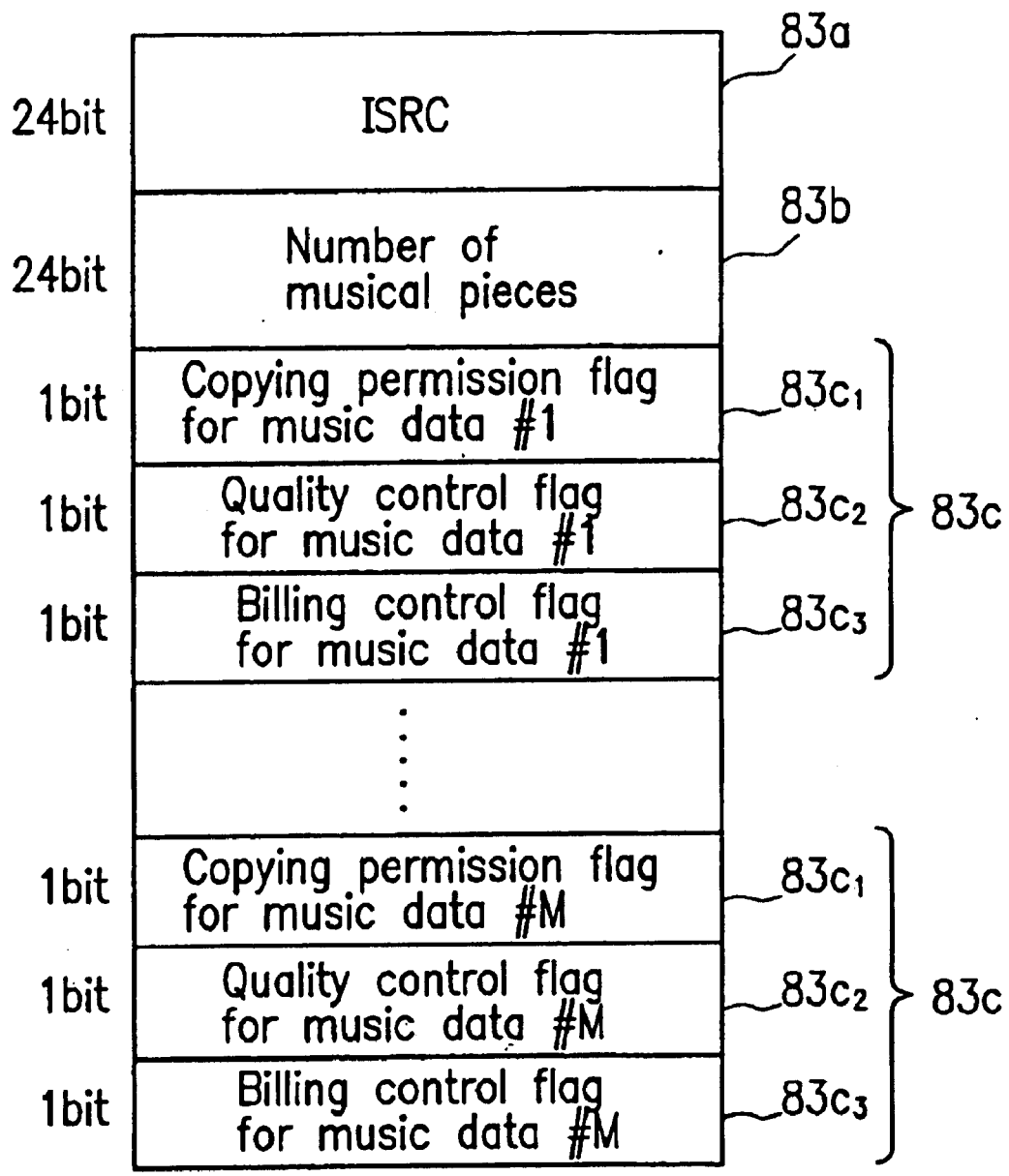
FIG. 3 is a diagram illustrating an exemplary data structure of modification control information 83.

FIG. 3 illustrates an exemplary data structure of the modification control information 83. In the following description, it is assumed that the modification control information 83 is included in the management information of the audio title file #1 (FIG. 2) and that the audio title file #1 includes the M music data #1-#M.

The modification control information 83 includes ISRC (international standard recording code) 83a, number-of-music data 83b and a plurality of flag sets 83a respectively corresponding to the music data #1-#M.

The ISRC 83a is ID information for identifying a music title (an audio title file). Each ISRC has a unique value and only one of such value exists throughout the world. For example, the ISRC 83a is a 24-bit code consisting of a country code (two ASCII characters), an owner code (three ASCII characters), the recording year (2-digit number) and a serial number (5-digit number).

The number-of-music data 83b indicates the number of music data recorded in the audio title file. The number-of-music data 83b is, for example, 24-bit data. In the example illustrated in FIG. 3, the value of the number-of-music data 83b is M.

The flag set 83c in defined for each of the music data #1-#M. The flag set 83a includes a copying permission flag $83c_1$ indicating whether copying of the music data is permitted, a quality control flag $83c_2$ for controlling the quality of modified music data obtained by modifying the music data, and a billing control flag $83c_3$ for controlling the billing for the copying of the music data.

Each of the copying permission flag $83c_1$ the quality control flag $83c_2$ and the billing control flag $83c_3$ is 1-bit data.

The copying permission flag $83c_1$ having a value of indicates that the copying of the music data is not permitted under any condition, and the copying permission flag $83c_1$ having a value of "1" indicates that the copying of the music data is permitted under particular conditions.

The particular conditions are defined by the value of the quality control flag $83c_2$ and the value of the billing control flag $83c_3$.

The quality control flag $83c_2$ having a value of "0" indicates that the copying of the music data is permitted under the condition that the quality of the music data is degraded, and the quality control flag $83c_2$ having a value of "1" indicates that the copying of the music data is permitted without degrading the quality of the music data.

The billing control flag 8302 having a value of "0" indicates that the copying of the music data is permitted without billing for the copying of the music data (i.e., free of charge), and the billing control flag 8303 having a value of "1" indicates that the copying of the music data is permitted under the condition that the copying of the music data is billed for.

Table 1 shows the relationship between each combination of the value of the copying permission flag $83c_1$, the value of the quality control flag $83c_2$ and the value of the billing control flag $83c_3$ and the condition under which the copying of the music data it permitted.

TABLE 1

| | Copying permission flag $83c_1$ | Quality control flag $83c_2$ | Billing control flag $83c_3$ | Copying permission condition |
|---|---|---|---|---|
| Case 1 | 0 | — | — | Copying always permitted |
| Case 2 | 1 | 0 | 0 | Copying permitted free of charge under the condition that the quality is degraded |
| Case 3 | 1 | 0 | 1 | Copying permitted under the condition that the quality is degraded and the copying is billed for |
| Case 4 | 1 | 1 | 0 | Copying permitted free of charge and without degrading the quality |
| Case 5 | 1 | 1 | 1 | Copying permitted without degrading the quality under the condition that the copying is billed for |

In Case 1 of Table 1, the value of the copying permission flag $83c_1$ is "0". Therefore, the copying of the music data is not permitted irrespective of the value of the quality control flag $83c_2$ and the value of the billing control flag $83c_2$.

In Case 2 of Table 1, the copying of the music data is permitted free of charge under the condition that the quality of the music data is degraded.

In Case 3 of Table 1, the copying of the music data is permitted under the condition that the quality of the music data is degraded and the copying of the music data is billed for.

In Case 4 of Table 1, the copying of the music data is permitted free of charge and without degrading the quality of the music data.

In Case 5 of Table 1, the copying of the music data is permitted without degrading the quality of the music data under the condition that the copying of the music data is billed for.

In this way, a variety of conditions under which copying of music data is permitted (or not permitted) can be realized by combining the value of the copying permission flag $83c_1$, the value of the quality control flag $83c_2$ and the value of the billing control flag $83c_3$ with one another.

The data modification control section 20 (FIG. 1A) determines whether it is required to bill for is the copying of the music data according to thee billing control flag $83c_3$. When it is determined that the billing is required, the data modification control section 20 controls the modification of the music data (i.e., determines whether the quality of the music data is to be degraded and, if it is to be degraded, to what degree it is to be degraded) according to the copying permission flag $83c_1$ and the quality control flag $83c_2$, after confirming the billing by the billing apparatus 200 (FIG. 1A). When it is determined that the billing is not required, the data modification control section 20 controls the modification of the music data (i.e. determines whether the quality of the music data is to be degraded and, if it is to be degraded, to what degree it is to be degraded) according to the copying permission flag $83c_1$ and the quality control flag $83c_1$, without confirming the billing by the billing apparatus 200.

Referring again to FIG. 1A, the details of the respective elements included in the data copying apparatus 100 will now be described.

The data read section 10 includes a data read circuit 11, a decryption key detection circuit 12, a modification control information detection circuit 13 and a decryption circuit 14.

The data read circuit 11 reads out the encrypted data 81 from the recording medium 80, and outputs the read encrypted data 81 to the decryption circuit 14. The decryption key detection circuit 12 detects the decryption key 82 from the recording medium 80, and outputs the detected decryption key 82 to the decryption circuit 14. The modification control information detection circuit 13 detects the modification control information 83 from the recording medium 80, and outputs the detected modification control information 83 to the data modification control section 20.

The decryption circuit 14 decrypts the encrypted data 81 which has been read out by the data read circuit 11 based on the decryption key 82 detected by the decryption key detection circuit 12. The decryption circuit 14 out-puts data obtained by decrypting the encrypted data 81 (hereinafter, referred to as the "decrypted data") to the data modification control section 20. The decrypted data corresponds to the music data before it is encrypted.

The data modification control section 20 includes a modification control circuit 21 and a data modification circuit 22.

The modification control information 83 detected by the modification control information detection circuit 13 is input to the modification control circuit 21.

The modification control circuit 21 determines whether it is required to bill for the copying of the decrypted data (e.g., the music data) according to the billing control flag $83c_3$ included in the modification control information 83.

When it is determined that the billing is required, the modification control circuit 21 communicates with the billing apparatus 200 according to a predetermined protocol to confirm the billing by the billing apparatus 200, after which the modification control circuit 21 produces a control signal 23 according to the copying permission flag $83c_1$ and the quality control flag $83c_2$. The confirmation of the billing by the billing apparatus 200 can be done by, for example, the reception by the modification control circuit 21 from the billing apparatus 200 of information which indicates completion of the billing. Such information may be received via the internet, for example.

For example, when the user of the data copying apparatus 100 pays the copyright holder of the recording medium 80 the royalty for the copying of the data recorded on the recording medium 80, information indicating completion of the billing is transmitted from the billing apparatus 200 to the modification control circuit 21.

When it is determined that the billing is not required, the modification control circuit 21 produces the control signal 23 according to the copying permission flag $83c_1$ and the quality control flag $83c_2$ without communicating with the billing apparatus 200.

According to the control signal 23, the data modification circuit 22 controls the modification of the decrypted data (e.g., the music data) (i.e., the data modification circuit 22 determines whether the quality of the decrypted data is to be degraded and, if it is to be degraded, to what degree it is to be degraded).

The output of the data modification circuit 22 is supplied to the data write section 30.

The data write section 30 includes an encryption circuit 31, a data write circuit 32 and an ID detection circuit 33.

The encryption circuit 31 encrypts the output of the data modification circuit 22 according to the second encryption method. The ID detection circuit 33 detects the ID information 92 recorded on the recording medium 90. The second encryption method is determined based on the ID information 92 detected by the ID detection circuit 33.

The data write circuit 32 writes the output of the encryption circuit 31 to the recording medium 90 as the encrypted data 91.

In this way, the encrypted data 81 recorded on the recording medium 50 is copied on the recording medium 90.

FIG. 1B illustrates an exemplary configuration of the modification control circuit 21. The modification control circuit 21 includes a data selection circuit 21a for selecting one of a plurality of data that is to be copied, a quality level selection circuit 21b for selecting a quality level of copied data, a royalty calculation circuit 21a for calculating a royalty required for the copying of the data, and a control circuit 21d for controlling the data selection circuit 21a, the quality level selection circuit 21b and the royalty calculation circuit 21c.

The control circuit 21d receives the modification control information 83 and controls the data selection circuit 21a to produce a data selection screen window based on the modification control information 83.

The data selection circuit 21a produces the data selection screen window and displays the data selection screen window on an input/output apparatus 300.

FIG. 4A illustrates an exemplary data selection screen window. In the example illustrated in FIG. 4A, the following columns are displayed as well as a message prompting the user to select a musical piece to be copied: "Music number", "Title" "Copying permitted", "High quality copying permitted" and "Billing for copying required". In the example illustrated in FIG. 4A, it is assumed that music data #1–#4 are recorded on the recording medium 80.

The column "Music number" in the data selection screen window shows the respective index numbers of the music data #1–#4. The column "Title" shows the respective titles of the music data #1–#4.

The column "Copying permitted" in the data selection screen window corresponds to the copying permission flag $83c_3$ included in the modification control information 83. Thus, the column "Copying permitted" shows "No" when the value of the copying permission flag $83c_1$ is "0", and the column "Copying permitted" shows "Yes" when the value of the copying permission flag $83c_1$ is "1".

The column "High quality copying permitted" in the data selection screen window corresponds to the quality control flag $83c_2$ included in the modification control information 83. Thus, the column "High quality copying permitted" shows "No" when the value of the quality control flag $83c_2$ is "0", and the column "High quality copying permitted" shows "Yes" when the value of the quality control flag $83c_3$ is "1".

The column "Billing for copying required" in the data selection screen window corresponds to the billing control flag $83c_3$. Thus, the column "Billing for copying required" shows "No" when the value of the billing control flag $83c_3$ it "0", and the column "Billing for copying required" shows "Yes" when the value of the billing control flag $83c_3$ is "1".

In the following description, it is assumed that the user has selected "song01" and "song02" as musical pieces to be copied. For example, such selection can be made by the user by using the input/output apparatus 300 (e.g. a keyboard or a mouse).

For both "song01" and "song02" which have been selected by the user, the column "Billing for copying required" shows "Yes". Therefore, before the data can be copied, it is necessary to confirm that the billing for the copying has been done by the billing apparatus 200.

The data selection circuit 21a transmits the respective data for "song01" and "song02" which have been selected by the user to the billing apparatus 200. In response to the data, the billing apparatus 200 returns royalty data for "song01" for different quality levels and royalty data for "song02" for different quality levels to the quality level selection circuit 21b.

The quality level selection circuit 21b produces a quality level selection screen window based on the data returned from the billing apparatus 200 and displays the quality level selection screen window on the input/output apparatus 300.

FIG. 4B illustrates an exemplary quality level selection screen window. In the example illustrated in FIG. 4B, the following columns are displayed as well as a message prompting the user to select a quality level for each musical piece to be copied: "Music number", "Title", "Royalty for quality level 1 (2 ch, 20 bit, 48 kHz)", "Royalty for quality level 2 (6 ch, 20 bit, 48 kHz)" and "Royalty for quality level 3 (6 ch, 24 bit, 192 kHz)". In the example illustrated in FIG. 4B, it is assumed that the quality level of "song01" and "song02" recorded on the recording-medium 80 is quality level 3 (6 ch, 24 bit, 192 kHz).

The column "Royalty for quality level 1 (2 ch, 20 bit, 48 kHz)" shows the royalty to be paid by the user for copying the music data recorded on the recording medium 80 to obtain music data having quality level 1.

The column "Royalty for quality level 2 (6 ch, 20 bit, 48 kHz)" shows the royalty to be paid by the user for copying the music data recorded on the recording medium 80 to obtain music data having quality level 2.

The column "Royalty for quality level 3 (6 ch, 24 bit, 192 kHz)" shows the royalty to be paid by the user for copying the music data recorded on the recording medium 80 to obtain music data having quality level 3.

Therefore, when the user selects quality level 3, the music data recorded on the recording medium 80 is copied without degrading the quality of the music data. When the user selects quality level 1 or quality level 2, the music data recorded on the recording medium 80 is copied while the quality of the music data is degraded.

In the following description, it is assumed that the user selects quality level 3 for "song01" and quality level 2 for "song02". For example, such selection can be made by the user by using the input/output apparatus 300 (e.g., a keyboard or a mouse).

The quality level selection circuit 21b transmits data for "song01" at quality level 3 and data for "song02" at quality level 2 to the billing apparatus 200. In response to the data, the billing apparatus 200 returns royalty data for "song01" at quality level 3 and royalty data for "song02" at quality level 2 to the royalty calculation circuit 21a.

The royalty calculation circuit 21c produces a royalty confirmation screen window based on the data returned from the billing apparatus 200 and displays the royalty confirmation screen window on the input/output apparatus 300.

FIG. 4C illustrates an exemplary royalty confirmation screen window. In the example illustrated in FIG. 4C, the total royalty (135 yen) for copying the music data of the selected musical pieces "song01" and "song02" to obtain music data respectively having the selected quality levels is displayed, as well as a message prompting the user to input "Yes" or "No" to indicate that the user approves or does not approve the royalty.

When the user inputs "Yes" to approve the royalty (i.e., when the user approves the billing for the copying of the data), the billing apparatus 200 performs a billing operation. For example, the billing apparatus 200 withdraws the amount of money billed from the user's bank account, or the like. The billing apparatus 200 is a remote server which can be connected to the data copying apparatus 100 via, for example, the internet or a telephone line.

Based on passwords which are registered by respective users upon user registration, the billing apparatus 200 identifies whether the entity who has approved the billing is a registered user. The billing apparatus 200 may alternatively be a card slot through which a prepaid card or an IC card is inserted.

When the billing by the billing apparatus 200 has been done, the billing apparatus 200 sands a signal to the royalty calculation circuit 21a notifying that the billing has been done. In response to the receipt by the royalty calculation circuit 21a of the signal notifying that the billing has been done, the control circuit 21d outputs the control signal 23.

FIG. 1C illustrate an exemplary configuration of the data modification circuit 22. The data modification circuit 22 includes a circuit 22a for degrading data having quality level 3 into data having quality level 1, a circuit 22b for degrading data having quality level 3 into data having quality level 2, a circuit 22a for passing forward data having quality level 3 without degrading the data, and a switch 22d for selectively inputting the output of the decryption circuit 14 to one of the circuits 22a–22c.

The circuit 22a includes a mix-down circuit $22a_1$ and a down-sampling circuit $22a_2$.

The mix-down circuit $22a_1$ performs a mix-down operation for reducing the number of channels of a sound signal from 6 to 2. The mix-down operation is done not by simply cutting off 4 of 6 channels, but by mixing the channels with one another according to a certain fixed parameter.

The down-sampling circuit $22a_2$ performs a down-sampling operation for reducing the number of sampling bits from 24 to 20 and reducing the sampling frequency from 192 kHz to 48 kHz. The down-sampling operation is based on an ordinary acoustic theory.

The circuit $22b$ includes a down-sampling circuit $22b_1$. The down-sampling operation performed by the down-sampling circuit $22b_1$ is the same as that performed by the down-sampling circuit $22a_2$.

The switch $22d$ 16 controlled based on the control signal 23.

When the user selects "quality level 1", the switch $22d$ is controlled so that the output of the decryption circuit 14 is input to the circuit $22a$. In such a case, the quality of the data is degraded by the circuit $22a$ from quality level 3 to quality level 1.

When the user selects "quality level 2", the switch $22d$ is controlled so that the output of the decryption circuit 14 is input to the circuit $22b$. In such a case, the quality of the data is degraded by the circuit $22b$ from quality level 3 to quality level 2.

When the user selects "quality level 3", the switch $22d$ is controlled so that the output of the decryption circuit 14 is input to the circuit $22a$. In such a case, the data passes through the circuit $22c$. As a result, the quality of the data is not degraded but maintained at quality level 3.

In the examples illustrated in FIGS. 1A–1C, each element included in the data copying apparatus 100 is implemented by hardware (a circuit). The function of each element included in the data copying apparatus 100 may alternatively be implemented by software.

Figure 5A:
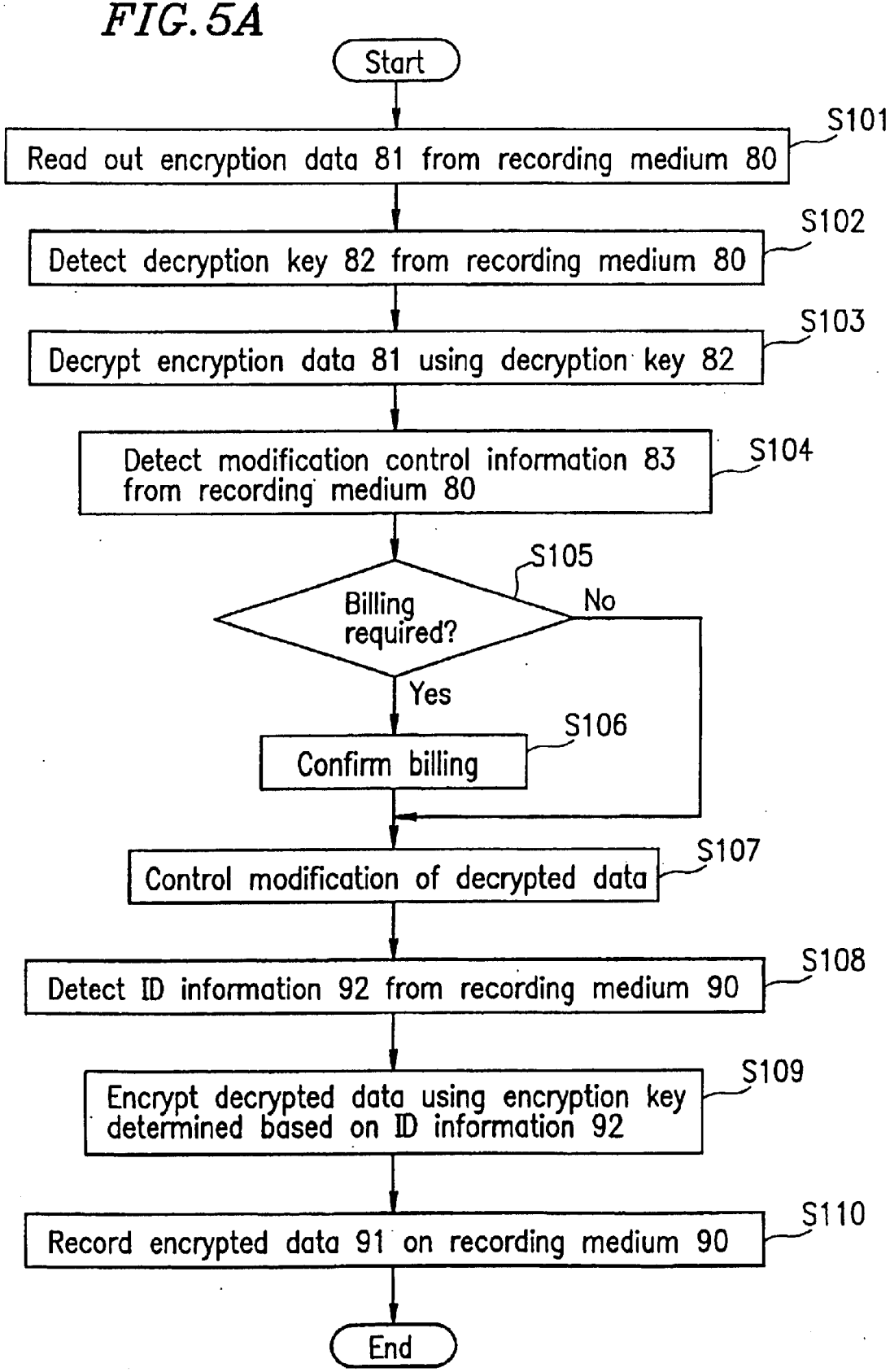
FIG. 5A is a flow chart illustrating a flow of a data copying operation.

FIG. 5A is a flow chart illustrating the flow of a data copying operation. By using a computer to perform the data copying operation illustrated in FIG. 5A, it is possible to implement a function equivalent to the function of each element of the data copying apparatus 100 illustrated in FIG. 1A.

Figure 5B:
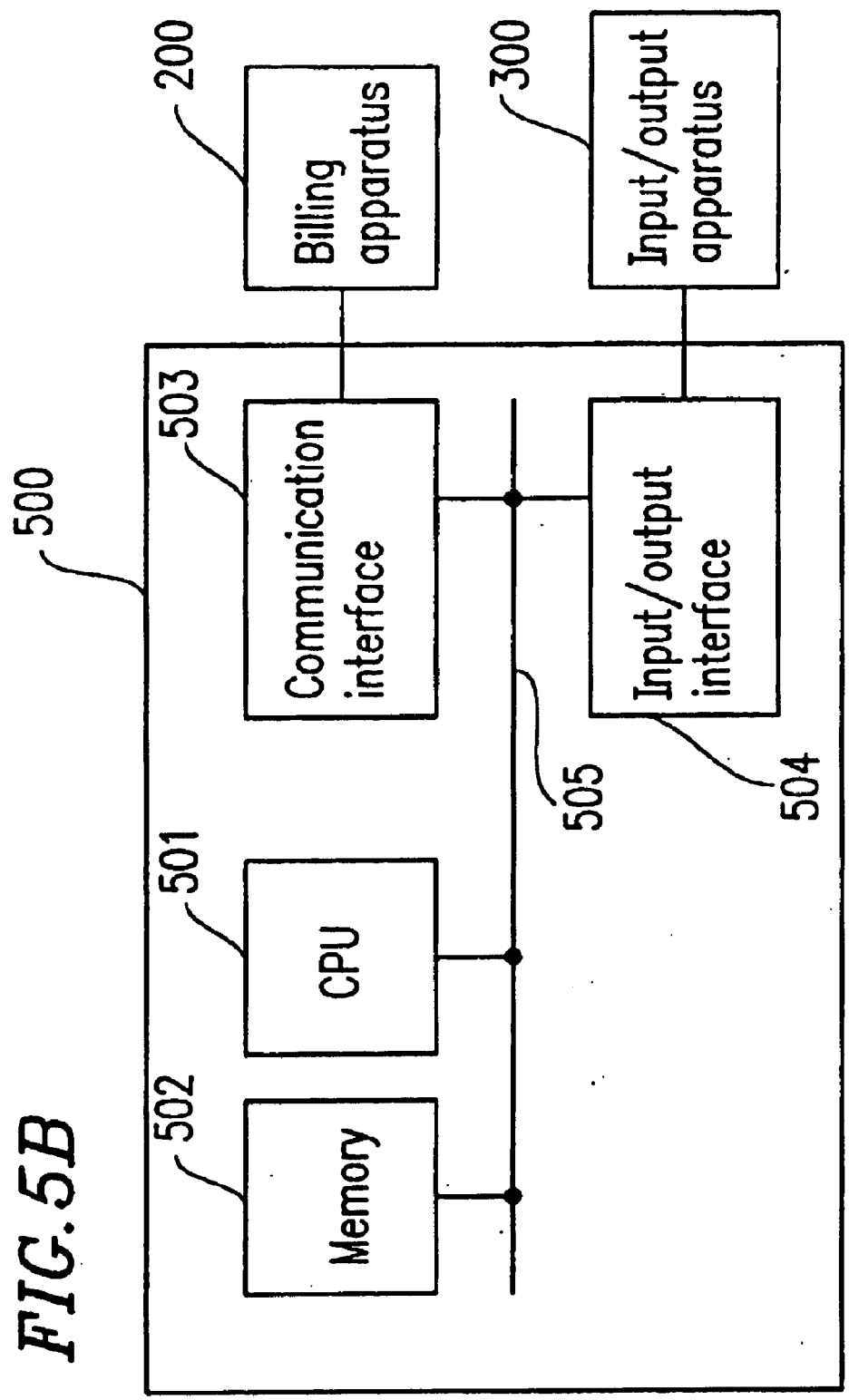
FIG. 5B is a block diagram illustrating a configuration of a computer 500 for performing the data copying operation illustrated in FIG. 5A.

FIG. 5B illustrates a configuration of a computer 500 for performing the data copying operation illustrated in FIG. 5A.

The computer 500 includes a CPU 501, a memory 502, a communication interface 503, an input/output interface 504 and a bus 505. The CPU 501, the memory 502, the communication interface 503 and the input/output interface 504 are connected to one another via the bus 505. The communication interface 503 is configured so that it can be connected to the billing apparatus 200 (FIG. 1A) via a network such as the internet. The input/output interface 504 is configured so that it can be connected to the input/output apparatus 300 (FIG. 1A).

A program representing the data copying operation illustrated in FIG. 5A (hereinafter, referred to as the "data copying operation program") is stored in the memory 502, for example. The data copying operation program may alternatively be recorded on any other type of recording medium such as a floppy disk, a CD-ROM, or a DVD-ROM. The data copying operation program recorded on such a recording medium is loaded on the memory 502 of the computer 500 via the input/output apparatus 300 (e.g., a disk drive). The CPU 501 performs the data copying operation program. Thus, the computer 500 functions as the data copying apparatus 100 (FIG. 1A).

Respective steps of the data copying operation will now be described with reference to FIG. 5A. Each step is performed by the CPU 501 (FIG. 5B).

Step S101: The CPU 501 reads out the encrypted data 81 from the recording medium 80.

Step S102: The CPU 501 detects the decryption key 82 from the recording medium 80.

Step S103: The CPU 501 decrypts the encrypted data 81 by using the decryption key 82 so as to produce decrypted data.

Step S104: The CPU 501 detects the modification control information 83 from the recording medium 80.

Step S105: The CPU 501 determines whether it is required to bill for copying of the decrypted data according to the billing control flag $83c_2$ included in the modification control information 83. The process proceeds to step S106 when it is determined that the billing is required, and to step S107 when it is determined that the billing is not required.

Step S106: The CPU 501 confirms that the billing has been done by the billing apparatus 200.

Step S107: The CPU 501 controls the modification of the decrypted date (i.e., determines whether the quality of the decrypted data is to be degraded and, if it is to be degraded, to what degree it is to be degraded) according to the copying permission flag $83c_1$ and the quality control flag $83c_2$ included in the modification control information 83.

Step S108: The CPU 501 detects the ID information 92 from the recording medium 90.

Step S109: The CPU 501 encrypts the decrypted data by using an encryption key which is determined based on the ID information 92.

Step S105: The CPU 501 records the encrypted data 91 on the recording medium 90.

FIG. 6 illustrates a procedure of, the communication process between the data copying apparatus 100 and the billing apparatus 200.

In the first column of FIG. 6, each step, S601–S616, is shown.

In the second column of FIG. 6, each black dot denotes which one of the data copying apparatus 100 and the billing apparatus 200 is to perform the operation, and each arrow denotes the direction of data transmission between the data copying apparatus 100 and the billing apparatus 200.

The third column of FIG. 6 shows the name of each function involved in the communication process between the data copying apparatus 100 and the billing apparatus 200.

Step S601: Using the data selection screen window as illustrated in FIG. 4A, the user selects one or more musical pieces to be copied to the recording medium 90 from a group of musical pieces recorded on the recording medium 80.

Step s602: If the musical pieces selected by the user include one for which the value of the copying permission flag $830_1$ is "1", and the value of the billing control flag $83c_3$ is "1", the data copying apparatus 100 sends to the billing apparatus 200 a connection confirmation signal for confirming the connection to the billing apparatus 200 (Search_Server( )).

Step S603: Upon receiving the connection confirmation signal, the billing apparatus 200 sends the ID of the billing apparatus 200 to the data copying apparatus 100 to indicate that the billing apparatus 200 is active (Reply_Server( )). The ID of the billing apparatus 200 is identification information unique to the billing apparatus 200.

Step S604: The data copying apparatus 100 checks whether the received ID is the ID of the billing apparatus 200. When the received ID is the ID of the billing apparatus 200, the data copying apparatus 100 starts the billing operation.

Step S605: The data copying apparatus 100 sends data A to the billing apparatus 200 (Send(Data_A)).

FIG. 7A illustrates an exemplary format of data A.

Data A includes a list of musical pieces (Music number #1-#L) which are permitted to be copied on the condition that the copying is billed for. Herein, L is an integer which satisfies 1≦L≦M. "User ID" included in data A is a user number unique to the user. "ISRC" included in data A has the same contents as the ISRC 83a included in the modification control information 83 which is detected from the recording medium 80. Only one "ISRC" is included in data A because in the example illustrated in FIG. 7A, data copying is permitted only in blocks of audio title files. "Number of musical pieces" included in data A denotes the number L of musical pieces, among all the musical pieces selected by the user, which are permitted to be copied on the condition that the copying is billed for.

FIG. 8A illustrates a specific example of data A. The example illustrated in FIG. 5A shows that music number #1 and music number #2 are selected as musical pieces which are permitted to be copied under the condition that the copying is billed for. The user ID is "HQ001", the ISRC is "JPABC9812345", and the number of musical pieces is 2.

Step S606: The billing apparatus 200 verifies the user ID included in received data A.

Step S607: When it is confirmed that the user ID is valid, the billing apparatus 200 sends data B to the data copying apparatus 100 (Send(Data_B)).

FIG. 7B illustrates an exemplary format of data B.

Data B includes a list of royalties for copying each music number #1-#L, specified by data A, at respective quality levels 1–3.

FIG. 8B illustrates a specific example of data B. In the example illustrated in FIG. 8B, the royalty for copying music number #1 at quality level 1 is 20 yen, the royalty for copying music number #1 at quality level 2 is 50 yen, and the royalty for copying music number #1 at quality level 3 is 100 yen. The royalty for copying music number #2 at quality level 1 is 15 yen, the royalty for copying music number #2 at quality level 2 is 35 yen, and the royalty for copying music number #2 at quality level 3 is 70 yen.

Step S608: Using the quality level selection screen window as illustrated in FIG. 4B, the user selects a quality level for each music number #1-#L specified by data A. The quality level is expressed in terms of, for example, the number of channels, the quantization rate and/or the sampling rate.

Step S609: The data copying apparatus 100 sends data C, which indicates the quality level selected by the user, to the billing apparatus 200 (Send(Data_C)).

FIG. 7C illustrates an exemplary format of data C.

Data C includes a list of quality levels selected by the user for the respective music number #1-#L specified by data A. In data C, the quality level value "1" indicates that given data is copied to obtain data having quality level 1, the quality level value "2" indicates that given data is copied to obtain data having quality level 2, and the quality level value "3" indicates that given data is copied to obtain data having quality level 3.

FIG. 8C illustrates a specific example of data C. In the example illustrated in FIG. 5C, quality level 3 is selected for music number #1, and quality level 2 is selected for music number #2.

Step S610: The billing apparatus 200 receives data C and produces data D based on data C.

Step S611: The billing apparatus 200 sends data D to the data copying apparatus 100 (Send(Data_D)).

FIG. 7D illustrates an exemplary format of data D.

Data D includes a list of final royalties for copying the respective music number #1-#L specified by data A. "Application ID" included in data D is an ID which is assigned by the billing apparatus 200 for each data copying.

FIG. 8D illustrates a specific example of data D. In the example illustrated in FIG. 5D, the application ID is "A0019". The royalty for copying music number #1 at quality level 3 is 100 yen, and the royalty for copying music number #2 at quality level 2 is 35 yen.

Step S612: Using the royalty confirmation screen window as illustrated in FIG. 4C, the user confirms the total royalty for copying each selected music data to obtain music data having the selected quality level. If the user approves the total royalty (e.g., 135 yen in the example illustrated in FIG. 4C), the user inputs its password which has been registered upon user registration to the data copying apparatus 100.

Step S613: The data copying apparatus 100 produces data E based on the password input by the user, and sends data E to the billing apparatus 200 (Send(Data_E).

Figure 7E:
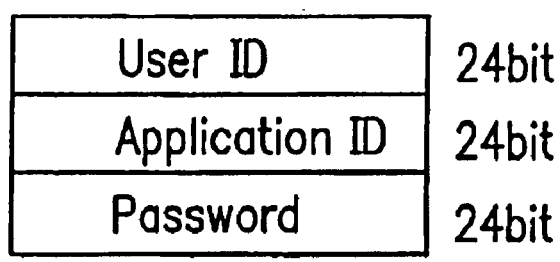
FIG. 7E is a diagram illustrating an exemplary format of data E transmitted between the data copying apparatus 100 and the billing apparatus 200.

FIG. 7E illustrates an exemplary format of data E.

Data E indicates whether the proper user has finally approved the billing. "Password" included in data E shows "0" when the user has canceled the billing, and shows the user's password when the user has approved the billing.

FIG. 8E illustrates a specific example of data E. The example illustrated in FIG. 5E is a case where the user approves the billing. Data E includes the user's password "2611".

Step S614: The billing apparatus 200 receives data E and verifies the password included in received data E.

Step S615: When the password is proper, the billing apparatus 200 sends data F to the data copying apparatus 100 (Send(Data_F)), and the amount of money billed is paid from the user's account.

Figure 7F:
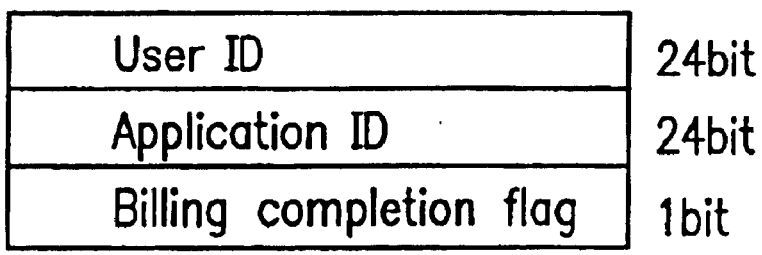
FIG. 7F is a diagram illustrating an exemplary format of data F transmitted between the data copying apparatus 100 and the billing apparatus 200.

FIG. 7F is an exemplary format of data F.

"Billing completion flag" included in data F indicates whether the billing has been done by the billing apparatus 200. "Billing completion flag" having a value of "0" indicates that the billing has not been done by the billing apparatus 200, and "Billing completion flag" having a value of "1" indicates that the billing has been done by the billing apparatus 200.

FIG. 8F illustrates a specific example of data F. The example illustrated in FIG. 8F shows that the billing for the user ID "HQC001" and the application ID "A001" has been done.

Step S616: The data copying apparatus 100 duplicates the selected musical pieces at the respective quality levels selected.

In the above-described embodiment, it is assumed that data on the recording medium 80 and data on the recording medium 90 are encrypted data. However, the principle of the present invention can alternatively be applied to a case where data on the recording medium 80 and data on the recording medium 90 are not encrypted.

The decryption key 82 may alternatively be encrypted by an encryption method that is different from that used for the encrypted data 81. In such a case, the data copying apparatus 100 may have a circuit (or a step) for decrypting the decryption key 82 and a decryption key for decrypting the decryption key 82. Such a decryption for decrypting the decryption key 82 is different from the decryption key 82 which is used for decrypting the encrypted data 81.

In the above-described embodiment, one or more of the copying permission flag $83c_1$, the quality control flag $83c_2$ and the billing control flag $83c_3$ may alternatively be included in the encrypted data 81.

The modification control information 83 may alternatively be encrypted in order to prevent fraudulent copying of the modification control information 83.

The modification control information 83 may alternatively be included in the encrypted data 81 as an electronic watermark.

Watermark is a technique to embed a piece of data in another piece of data, which is characterized by the following features (1) and (2):

(1) The embedded data does not substantially degrade the quality of the original data; and (2) The embedded data can be detected even if the original data to somewhat processed.

For example, using the watermark technique, information having a value of "0" or "1" can be embedded in a position of audio data corresponding to a frequency f. For example, information having a value of "1" is embedded in the audio data if the gain of the audio data at the frequency f (Hz) is greater than a predetermined threshold value $T_H$ (dB), and information having a value of "0" is embedded in the audio data if the gain of the audio data at the frequency f (Hz) is not greater than a predetermined threshold value $T_H$ (dB).

The frequency f and the predetermined threshold value $T_H$ are kept secret. In this way, it is very difficult for a third party to fraudulently obtain the information embedded in the audio data. Moreover, since the watermark is embedded in the audio data's waveform itself, it is substantially impossible to erase the watermark no matter how the audio data is processed unless the quality of the audio data is substantially degraded.

For example, a high pass filter for cutting off a low frequency component of a signal and a low pass filter cutting off a high frequency component of the signal may be used in order to detect the watermark embedded in the audio data. Thus, the high pass filter is used to out off a component of the audio data whose frequency is less than the frequency f, and the low pass filter is used to cut of f component of the audio data whose frequency is greater than the frequency f. As a result, the frequency f component of the audio data is extracted. The information embedded in the audio data is detected by comparing the gain of the frequency f component with the predetermined threshold value Th.

Using the above-described watermark technique, it is possible to embed the copying permission flag $83c_1$ for the music data #i in a position of the music data #i corresponding to a frequency f1y, the quality control flag $83c_2$ for the music data #1 in a position corresponding to a frequency $f_{i2}$, and the billing control flag $83c_3$ for the music data #i in a position corresponding to a frequency $f_{i3}$. Herein, i is any integer which satisfies $1 \leq i \leq M$ where "M" is as previously defined. Preferably, the frequencies $f_{i1}$, $f_{i2}$ and $f_{i3}$ are included in a frequency band which does not substantially affect the reproduction of the music data i (e.g., a frequency band outside the audible range). Moreover, the frequencies $f_{i1}$, $f_{i2}$ and $f_{i3}$ are preferably spaced apart from one another so as to avoid misdetection. It is possible to use either the same threshold value or different threshold values for the frequencies $f_{i1}$, $f_{i2}$ and in the above-described embodiment, the billing information indicating that the billing is done by the billing apparatus 200 is input from outside the data copying apparatus 100. Alternatively, such billing information may be recorded on the recording medium 80. Moreover, such billing information may alternatively be encrypted as is the modification control information 83.

As described above, the data copying system of the present invention controls the modification of data which has been read out from a recording medium according to the modification control information. The modification control information includes the copying permission flag, the quality control flag and the billing control flag. A variety of conditions under which copying of data is permitted can be realized by combining these flags with one another. For example, with permission by the copyright holder, the data can be copied without degrading the quality of the data either free of charge or under the condition that the copying is billed for.

By controlling the modification of the data according to the modification control information, it is possible to provide data having different quality levels as copied data. In this way, it is possible to allow the user to select the quality level of the copied data to the user's preference.

Moreover, the modification control information can be encrypted or embedded in a predetermined frequency band of the data that is recorded on the recording medium, so as to prevent fraudulent copying of the data which is against the copyright holder's intention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data copying system, comprising a data copying apparatus for copying data recorded on a first recording medium to a second recording medium and a billing apparatus for billing for the copying of the data, wherein a first modification control information is recorded on the first recording medium, the first modification control information includes a copying permission flag indicating whether copying of the data is permitted, a quality control flag indicating whether quality control of the data is required as a condition for permitting the copying of the data and a billing control flag indicating whether billing is recorded as a condition for permitting the copying of the data, the data copying apparatus including:

a data read section for reading out the data and the first modification control information from the first recording medium;

a data modification control section for controlling modification of the data in accordance with the first modification control information or a second modification control information transmitted from the billing apparatus as necessary; and a data write section for writing an output of the data modification control section to the second recording medium, wherein:

the second modification control information is information transmitted from the billing apparatus to the data copying apparatus when billing is required for the copying of the data, the second modification control information comprises at least one set of quality level information and royalty information, the quality level information indicating which level the data is modified into and the royalty information indicating an amount of the billing corresponding to the quality level;

the data modification control section determines whether billing is required for the copying of the data in accordance with the billing control flag;

when the billing is required, the data modification control section receives the second modification control information from the billing apparatus, allows a user to select one set of the at least one set of quality level information and royalty information included in the second modification control information, and controls the modification of the data in accordance with the quality level information of the one set selected by the user, after confirming that the billing has been done by the billing apparatus in accordance with the royalty information of the one set selected by the user; and;

when the billing is not required, the data modification control section controls the modification of the data in accordance with the first modification control information, without confirming that the billing has been done by the billing apparatus.

2. A data copying system according to claim 1, wherein the first modification control information is encrypted.

3. A data copying system according to claim 1, wherein the first modification control information is included in a predetermined frequency band of the data that is recorded on the first recording medium.

4. A data copying system according to claim 1, wherein the data modification control section outputs modified data having a quality level in accordance with the first modification control information or the second modification control information.

5. A data copying apparatus for copying data recorded on a first recording medium to a second recording medium, wherein a first modification control information is recorded on the first recording medium, the first modification control information includes a copying permission flag indicating whether copying of the data is permitted, a quality control flag indicating whether quality control of the data is required as a condition for permitting the copying of the data and a billing control flag indicating whether billing is recorded as a condition for permitting the copying of the data, the data copying apparatus comprising:
 a data read section for reading out the data and the first modification control information from the first recording medium;
 a data modification control section for controlling modification of the data in accordance with the first modification control information or a second modification control information transmitted from a billing apparatus provided outside the data copying apparatus as necessary; and
 a data write section for writing an output of the data modification control section to the second recording medium, wherein:
 the second modification control information is information transmitted from the billing apparatus to the data copying apparatus when billing is required for the copying of the data, the second modification control information comprises at least one set of quality level information and royalty information, the quality level information indicating which level the data is modified into and the royalty information indicating an amount of the billing corresponding to the quality level;
 the data modification control section determines whether billing is required for the copying of the data in accordance with the billing control flag;
 when the billing is required, the data modification control section receives the second modification control information from the billing apparatus, allows a user to select one set of the at least one set of quality level information and royalty information included in the second modification control information, and controls the modification of the data in accordance with the quality level information of the one set selected by the user, after confirming that the billing has been done by a billing apparatus in accordance with the royalty information of the one set selected by the user; and when the billing is not required, the data modification control section controls the modification of the data in accordance with the first modification control information without confirming that the billing has been done by the billing apparatus.

6. A data copying apparatus according to claim 5, wherein the first modification control information is encrypted.

7. A data copying system according to claim 5, wherein the first modification control information is included in a predetermined frequency band of the data that is recorded on the first recording medium.

8. A data copying system according to claim 5, wherein the data modification control section outputs modified data having a quality level in accordance with the first modification control information or the second modification control information.

9. A data copying method for copying data recorded on a first recording medium to a second recording medium using a data copying apparatus, wherein a first modification control information is recorded on the first recording medium, the first modification control information includes a copying permission flag indicating whether copying of the data is permitted, a quality control flag indicating whether quality control of the data is required as a condition for permitting the copying of the data and a billing control flag indicating whether billing is recorded as a condition for permitting the copying of the data, the data copying method comprising the steps of:
 (a) reading out the data and the first modification control information from the first recording medium;
 (b) controlling modification of the data in accordance with the first modification control information or a second modification control information transmitted from a billing apparatus provided outside the data copying apparatus as necessary; and
 (c) writing an output of step (b) to the second recording medium, wherein:
 the second modification control information is information transmitted from the billing apparatus to the data copying apparatus when billing is required for the copying of the data, the second modification control information comprises at least one set of quality level information and royalty information, the quality level information indicating which level the data is modified into and the royalty information indicating an amount of the billing corresponding to the quality level;
 the step (b) comprises the steps of:
 (b-1) determining whether billing is required for the copying of the data in accordance with the billing control flag;
 (b-2) when the billing is required, receiving the second modification control information from the billing apparatus, allowing a user to select one set of the at least one set of quality level information and royalty information included in the second modification control information, and controlling the modification of the data in accordance with the quality level information of the one set selected by the user, after confirming that the billing has been done in accordance with the royalty information of the one set selected by the user; and (b-3) when the billing is not required, controlling the modification of the data in accordance with the first modification control information, without confirming that the billing has been done.

10. A computer-readable recording medium recorded with a program for controlling a computer to perform a data copying operation for copying data recorded on a first recording medium to a second recording medium, wherein a first modification control information is recorded on the first recording medium, the first modification control information includes a copying permission flag indicating whether copying of the data is permitted, a quality control flag indicating whether quality control of the data is required as a condition for permitting the copying of the data and a billing control flag indicating whether billing is recorded as a condition for permitting the copying of the data, the data copying operation comprising the steps of:

(a) reading out the data and the first modification control information from the first recording medium;

(b) controlling modification of the data in accordance with the first modification control information or a second modification control information transmitted from a billing apparatus provided outside the computer as necessary; and (c) writing an output of step (b) to the second recording medium, wherein:

the second modification control information is information transmitted from the billing apparatus to the computer when billing is required for the copying of the data, the second modification control information comprises at least one set of quality level information and royalty information, the quality level information indicating which level the data is modified into and the royalty information indicating an amount of the billing corresponding to the quality level;

the step (b) comprises the steps of:

(b-1) determining whether billing is required for the copying of the data in accordance with the billing control flag;

(b–2) when the billing is required, receiving the second modification control information from the billing apparatus, allowing a user to select one set of the at least one set of quality level information and royalty information included in the second modification control information, and controlling the modification of the data in accordance with the quality level information of the one set selected by the user, after confirming that the billing has been done by the billing apparatus in accordance with the royalty information of the one set selected by the user; and (b-3) when the billing is not required, controlling the modification of the data in accordance with the first modification control information, without confirming that the billing has been done.

* * * * *